United States Patent [19]

Okubo et al.

[11] Patent Number: 4,685,657
[45] Date of Patent: Aug. 11, 1987

[54] MELTING FURNACE

[75] Inventors: Kunio Okubo, Ise; Takashi Yamashita, Mie, both of Japan

[73] Assignee: Shinko Electric Co. Ltd., Tokyo, Japan

[21] Appl. No.: 775,155

[22] Filed: Sep. 12, 1985

[30] Foreign Application Priority Data

Sep. 18, 1984 [JP] Japan .................... 59-195572

[51] Int. Cl.$^4$ ................................. C22B 9/16
[52] U.S. Cl. ...................... 266/234; 266/900; 266/901
[58] Field of Search ............. 266/900, 234, 242, 233, 266/901; 75/61, 44 S

[56] References Cited

U.S. PATENT DOCUMENTS

| 2,264,740 | 12/1941 | Brown | 266/900 |
| 2,648,715 | 8/1953 | Lillenberg | 266/242 |
| 3,671,029 | 6/1972 | Karlsson et al. | 266/234 |
| 3,869,112 | 3/1975 | Habayeb | 75/44 S |

FOREIGN PATENT DOCUMENTS 1350044 1/1972 United Kingdom .

Primary Examiner—L. Dewayne Rutledge
Assistant Examiner—S. Kastler
Attorney, Agent, or Firm—Scully, Scott, Murphy & Presser

[57] ABSTRACT

A melting furnace includes a body of a refractory material having a hollow melting portion for holding a molten material and a hollow heating portion disposed adjacent thereto for holding the molten material and maintaining the molten material at elevated temperatures. The melting portion has at its upper portion an opening through which a material to be melted is fed into the melting portion, the body having a pair of generally horizontally-spaced inlet and outlet ports each communicating the melting portion with the heating portion. An electromagnetic agitator is disposed below the melting portion for producing a shafting magnetic field in the melting portion which magnetic field shifts from the inlet port to the outlet port to thereby cause the molten material to move from the melting portion to the heating portion via the outlet port and then to move from the heating portion to the melting portion via the inlet port.

3 Claims, 3 Drawing Figures

MELTING FURNACE

BACKGROUND OF THE INVENTION

1. Field of the Invention

This invention relates to a melting furnace for melting a cold charge in an efficient manner.

2. Prior Art

One conventional melting furnace 50 shown in FIG. 1 includes a body 52 which comprises a heating portion 54 of a rectangular cross-section defined by a pair of side walls 54a and 54b, a pair of end walls (not shown) interconnecting the sides walls 54a and 54b at their opposite ends, an upper wall 54c and a bottom wall 54d and a melting portion 56 of a channel-shaped cross-section disposed adjacent to the heating portion 54 and defined by the side wall 54a, an outer side wall 56a, a pair of end walls (not shown) interconnecting the side walls 54a and 56a at their opposite ends, and a bottom wall 56c extending from the bottom wall 54d in coplanar relation thereto. The melting portion 56 has an open top 55 serving as a material-feed means through which a cold charge or metal to be melted is fed to the melting portion 56. Burners (not shown) serving as heating means are provided with their nozzles extending through the side wall 54b of the heating portion 54 for maintaining the interior of the heating portion 54 at elevated temperatures, so that the molten metal 58 in the heating portion 54 is not subjected to a temperature drop. An electromagnetic agitator 60 is mounted below the bottom wall 54d of the heating portion 54 for agitating the molten metal 58 in the heating portion 54 so as to keep a temperature thereof uniform over the entire area of the heating portion 54. The melting portion 56 communicates with the heating portion 54 via a port 62 formed through the side wall 54a. A vertically-movable gate or plate 64 is mounted on the side wall 54a with its lower end always kept dipped in the molten metal 58 to a certain extent for closing an upper end portion of the port 62. The gate 64 is moved vertically so that the lower end of the gate 64 is always dipped in the molten metal 58 to a predetermined degree. The gate 64 prevents impurities or whitewash, floating on the top of the molten metal 58 in the melting portion 56, from intruding into the heating portion 54. The heat of the heating portion 54 is fed to the melting portion 56 via the molten metal 58, flowing through the port 62, for melting a cold charge introduced into the melting portion 54 from the open top 55.

Since there is provided only one port 62 which communicates the melting portion 56 with the heating portion 54, the molten metal 58 agitated by the electromagnetic agitator 60 in the heating portion 54 flows into the melting portion 56 through the port 62 and then is returned to the heating portion 54 through the port 62. Thus, the flow of the molten metal 58 into the melting portion 56 tends to be cancelled by the flow of the molten metal 58 from the melting portion 56, so that the molten metal 58 of elevated temperatures in the heating portion 54 may not reach every corner portion of the melting portion 56, which results in failure to efficiently melt the cold charge fed to the melting portion 56.

SUMMARY OF THE INVENTION

It is therefore an object of this invention to provide a melting furnace of the type which has a high melting efficiency.

According to the present invention, there is provided a melting furnace comprising:

(a) a body of a refractory material having a hollow melting portion for holding a molten material and a hollow heating portion disposed adjacent thereto for holding the molten material and maintaining the molten material at elevated temperatures, said melting portion having at its upper portion an opening through which a material to be melted is fed into said melting portion, said body having a pair of generally horizontally-spaced inlet and outlet ports each communicating said melting portion with said heating portion; and (b) electromagnetic agitator disposed below said melting portion for producing a shifting magnetic field in said melting portion which magnetic field shifts from said inlet port to said outlet port to thereby cause the molten material to move from said melting portion to said heating portion via said outlet port and then to move from said heating portion to said melting portion via said inlet port.

DESCRIPTION OF THE PREFERRED EMBODIMENT OF THE INVENTION

Figure 1:
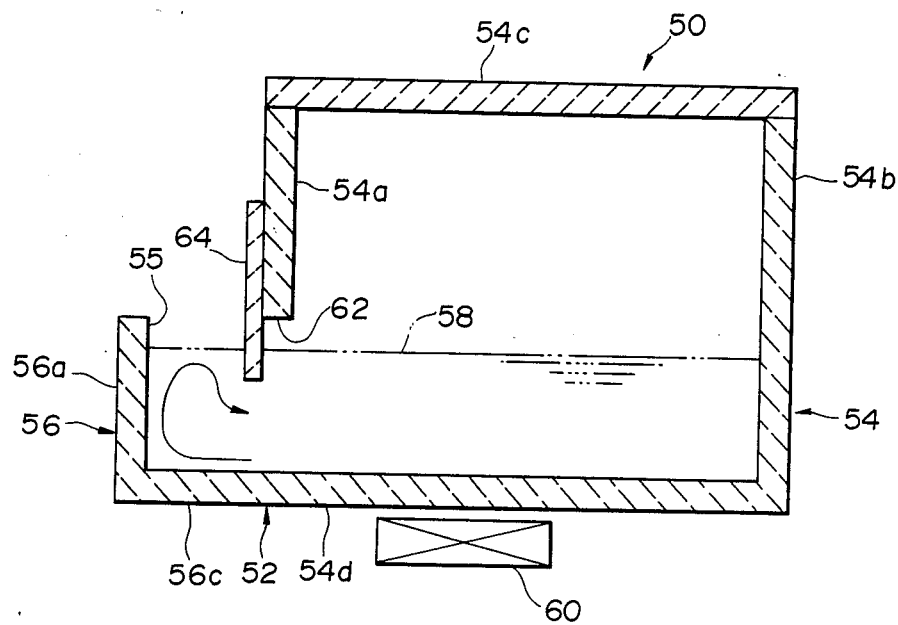
FIG. 1 is a vertical cross-sectional view of a melting furnace provided in accordance with the prior art.
Figure 2:
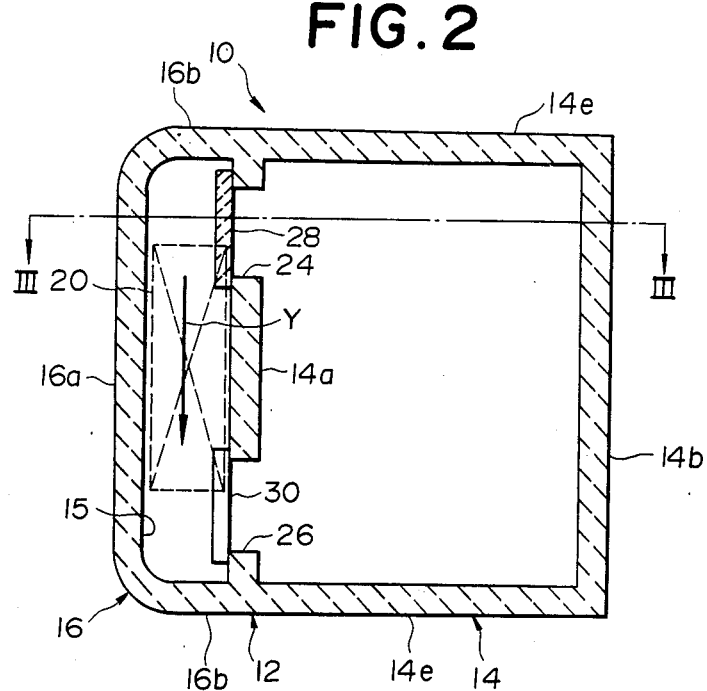
FIG. 2 is a horizontal cross-sectional view of a melting furnace provided in accordance with the present invention.
Figure 3:
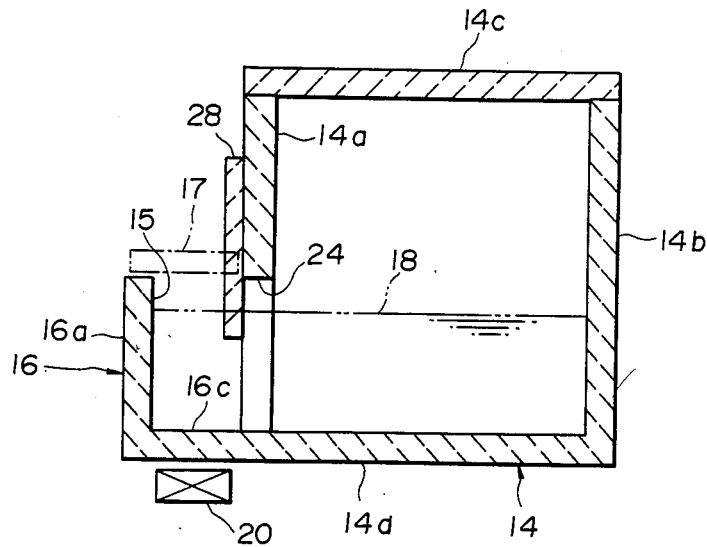
FIG. 3 is a cross-sectional view taken along the line III—III of FIG. 2.

A melting furnace 10 shown in FIGS. 2 and 3 includes a body 12 of an electrically-insulating refractory material which comprises a box-like heating portion 14 of a rectangular cross-section defined by a pair of parallel side walls 14a and 14b, a pair of parallel end walls 14e and 14e interconnecting the sides walls 14a and 14b at their opposite ends, an upper wall 14c and a bottom wall 14d, and a melting portion 16 of a channel-shaped cross-section disposed adjacent to the heating portion 14 and defined by the side wall 14a, an outer side wall 16a parallel to the side wall 14a, a pair of parallel end walls 16b and 16b interconnecting the parallel side walls 14a and 16a at their opposite ends, and a bottom wall 16c extending from the bottom wall 14d in coplanar relation thereto. The upper ends of the outer side wall 16a and the end walls 16b and 16b are disposed at the same level which is substantially lower than the upper wall 14c. Although not shown in the drawings, the heating portion 14 is covered by an thermally-insulating material. The melting portion 16 has an open top 15 serving as a material-feed means through which a cold charge or metal to be melted is fed to the melting portion 16. A lid 17 is adapted to be removably mounted on the melting portion 16 for covering the open top 15.

Burners (not shown) serving as heating means are provided with their nozzles extending through the side wall 14b of the heating portion 14 for maintaining the interior of the heating portion 14 at elevated temperatures, so that molten metal 18 in the heating portion 14 is not subjected to a temperature drop. An electromagnetic agitator 20 is mounted below the bottom wall 16c of the melting portion 16 for agitating the molten metal 18 in the heating portion 14 so as to keep a temperature thereof uniform over the entire area of the heating portion 14. The electromagnetic agitator 20 comprises an electromagnet which produces a magnetic field shifting in a direction indicated by an arrow Y (FIG. 2).

A pair of inlet and outlet ports 24 and 26 are formed through the side wall 14a at opposite end portions thereof, the inlet and outlet ports 24 and 26 having substantially the same height as the outer side wall 16a has. A pair of first and second gates or plates 28 and 30 are mounted on the side wall 14a for vertical movement to close the upper portions of said inlet and outlet ports, respectively. The lower end of each of the gates 28 and 30 is dipped in the molten metal 18 in the melting portion 16 to an extent enough to prevent impurities or whitewash, floating on the top of the molten metal 18 in the melting portion 16, from intruding into the heating portion 14. As the level of the surface of the molten metal 18 varies, the first and second gates 28 and 30 move vertically so that the lower ends thereof are always kept dipped in the molten metal 18 to a predetermined degree.

In operation, the shifting magnetic field shifting in the direction Y (FIG. 2), that is to say, from the inlet port 24 to the outlet port 26, is produced in the melting portion 16, so that the molten metal 18 in the melting portion 16 is caused by this shifting magnetic field to flow into the heating portion 14 through the outlet port 26 while the molten metal 18 in the heating portion 14 is caused to flow into the melting portion 16 through the inlet port 24. Thus, the molten metal 18 flows from the melting portion 16 via the outlet port 26, the heating portion 14 and the inlet port 24 into the melting portion 16. In this condition, the cold charge is fed to the melting portion 16 and is rapidly melted therein since the molten metal 18 of high temperatures is fed to the melting portion 16 from the heating portion 14 through the inlet port 24, so that the molten metal of a relatively low temperature in the melting portion 16 is fed to the heating portion 14 through the outlet port 26.

As described above, a flow of the molten metal 18 is produced in the melting portion 16 by the electromagnetic agitator 20 for circulation through the melting furnace 10 during the operation thereof, thereby achieving an enhanced melting efficiency.

What is claimed is:

1. A melting furnace comprising:
 (a) a body of a refractory material having a minor portion of the furnace forming a hollow minor melting portion for holding a molten material, and a major portion of the furnace forming a hollow major heating portion disposed adjacent thereto for holding most of the molten material and adding heat thereto and maintaining the molten material at elevated temperatures said major portion being larger then said minor portions, said minor melting portion having at its upper portion an opening through which material to be melted is fed into said minor melting portion, said body having a pair of generally horizontally-spaced inlet and outlet ports each communicating said minor melting portion with said major heating portion; and
 (b) electromagnetic agitator disposed below said minor melting portion for producing a shifting magnetic field in said minor melting portion which magnetic field shifts from said inlet port to said outlet port to thereby cause the molten material to move from said minor melting portion to said major heating portion via said outlet port and then to move from said major heating portion to said minor melting portion via said inlet port.

2. A melting furnace according to claim 1, in which a pair of first and second gates are mounted on said body for vertical movement for covering the upper portions of said inlet and outlet ports, respectively, the lower end of each of said first and second gates being dipped in said molten material.

3. A melting furnace according to claim 1, in which said body has a wall which separates said melting portion from said heating portion, said melting portion being elongated and extending along said wall, said inlet and outlet ports being formed through said wall and disposed at opposite end portions of said wall.

* * * * *